H. LOEFFLER.
SAFETY ATTACHMENT FOR CLOTHES WRINGERS.
APPLICATION FILED DEC. 18, 1913.
1,139,546.
Patented May 18, 1915.
2 SHEETS—SHEET 1.
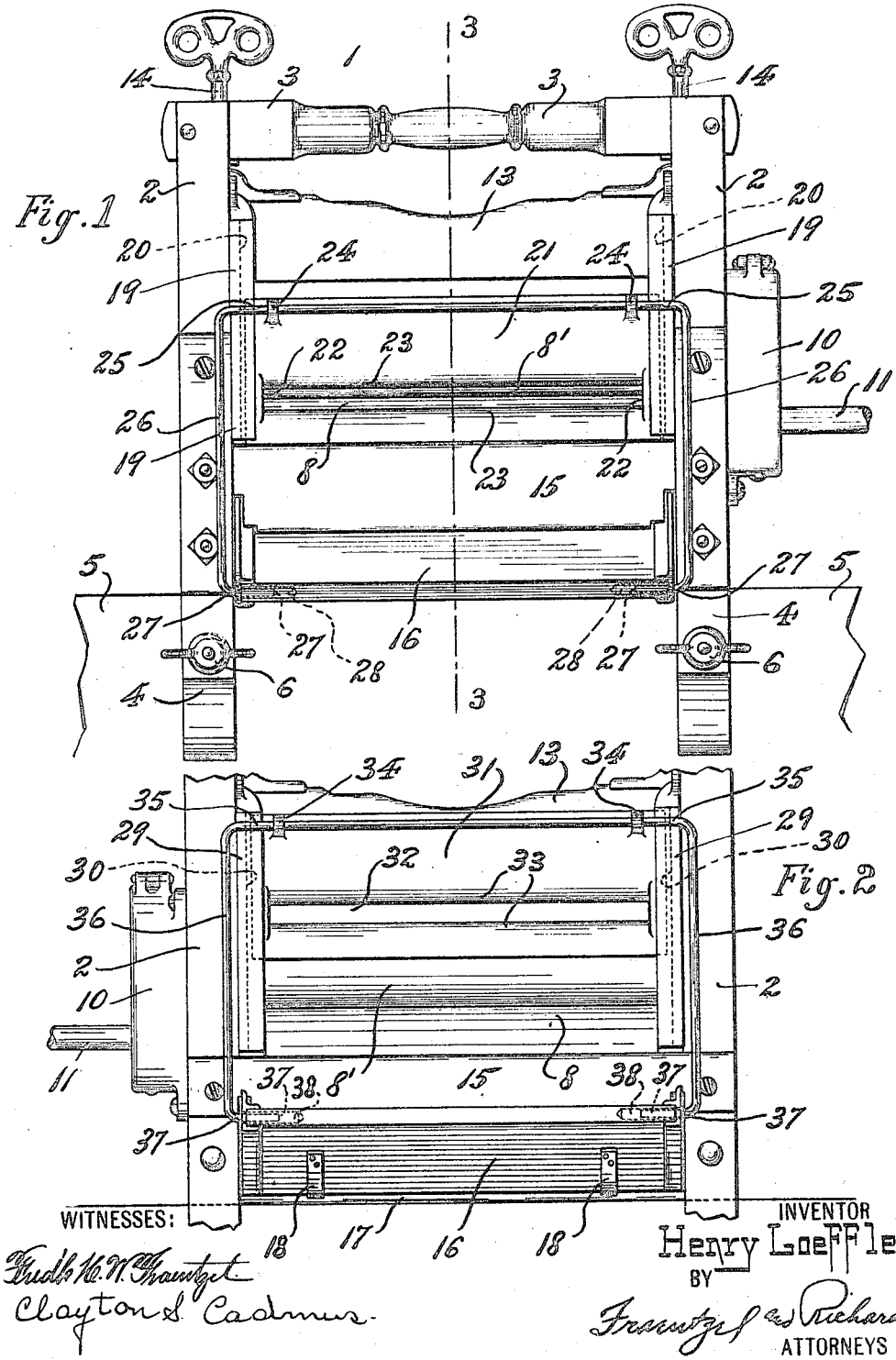
WITNESSES:
INVENTOR
Henry Loeffler,
BY
ATTORNEYS H. LOEFFLER.
SAFETY ATTACHMENT FOR CLOTHES WRINGERS.
APPLICATION FILED DEC. 18, 1913.
1,139,546.
Patented May 18, 1915.
2 SHEETS—SHEET 2.
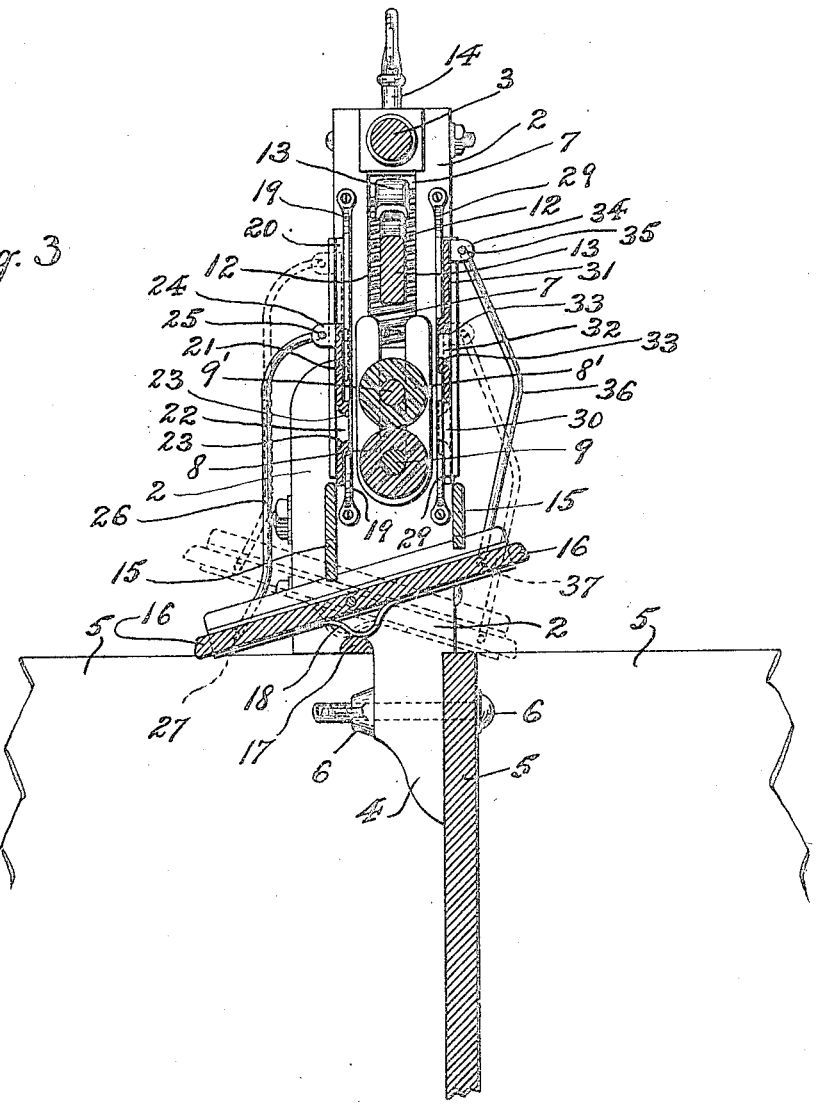
WITNESSES:
INVENTOR
Henry Loeffler,
BY
Frantzel & Richards,
ATTORNEYS

UNITED STATES PATENT OFFICE.

HENRY LOEFFLER, OF NEWARK, NEW JERSEY, ASSIGNOR TO HURLEY MACHINE COMPANY, OF CHICAGO, ILLINOIS, A CORPORATION OF ILLINOIS.

SAFETY ATTACHMENT FOR CLOTHES-WRINGERS.

1,139,546.　　　　Specification of Letters Patent.　　Patented May 18, 1915.

Application filed December 18, 1913. Serial No. 807,379.

*To all whom it may concern:*

Be it known that I, HENRY LOEFFLER, a citizen of the United States, residing at Newark, in the county of Essex and State of New Jersey, have invented certain new and useful Improvements in Safety Attachments for Clothes-Wringers; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

The present invention relates, generally, to improvements in clothes-wringers, and particularly in clothes-wringers of the power driven type; and the invention has reference, more particularly, to a novel attachment for clothes-wringers adapted to guard the rollers of the wringer in such a manner as to prevent the catching of the fingers and hands of the operator therein, thereby securing the operator against injury which might result in permanent crippling.

The invention has for its principal object to provide a safety device or guard for clothes-wringers, which is simple in construction and operation, cheap to manufacture, and very efficient in guarding the rollers of the clothes-wringer; the same being so constructed and arranged that the clothes to be wrung may be easily and quickly fed therethrough into operative contact with the said rollers, but which will bar the fingers or hands of the operator from contact with the rollers.

A further object of the present invention is to so arrange the guard-members, that a proper arrangement of the drip-board of the clothes-wringer will automatically position the guard-members with relation to the wringer-rollers, no matter from which side of the clothes-wringer the clothes are to be fed therethrough.

The present invention is of particular advantage when applied to power-driven clothes-wringers, in which the rollers are continuously rotated, the same being driven by an electric-motor, or source of power other than the muscular force of the operator. In such clothes-wringers the movement and stoppage of the rollers is not so readily and quickly controllable, since to stop the same the source of power must be shut off, hence it frequently happens, in the use of the same, that the operator catches the fingers and hands in the rollers, and under such circumstances is unable to stop the rollers in order to save the fingers and hands from injury, consequently frequently suffers serious injury often amounting to permanent crippling of the fingers or hands. It is the object of the present invention to render impossible such occurrences.

Other objects of the present invention, not at this time more particularly enumerated, will be clearly understood from the following detailed description of the present invention.

With the various objects of this invention in view, the same consists, primarily, in the novel safety device for clothes-wringers hereinafter set forth; and, furthermore, this invention consists in the novel arrangements and combinations of the various mechanisms and their parts, as well as in the details of the construction thereof, all of which will be hereinafter more fully described in the following specification, and then finally embodied in the claims which are appended to and which form an essential part of this specification.

The invention is clearly illustrated in the accompanying drawings, in which:—

Figure 1 is an elevation of one side of a clothes-wringer equipped with the novel safety device made according to and embodying the principles of the present invention; Fig. 2 is an elevation of the opposite side of said clothes-wringer so equipped, the upper portion of the clothes-wringer being broken away on this view; and Fig. 3 is a vertical cross-section of the same taken on line 3—3 in said Fig. 1.

Similar characters of reference are employed in all of the hereinabove described views, to indicate corresponding parts.

Referring now to the said drawings, the reference character 1 indicates a complete clothes-wringer, the same comprising the vertical standard-members 2, interconnected at their upper ends by the cross-head bar 3. The lower ends 4 of said standard-members 2 are adapted to be connected with the wash-tub body 5, by means of any of the well-known, or any suitable form of fastening devices 6.

Journaled in the usual journal-boxes, which are disposed in vertical openings 7 in said standard-members 2, are the pair of transversely extending wringer-rolls 8 and 8', the same being positioned one above the other in the usual manner so as to receive the clothes to be wrung therebetween. The shafts 9 and 9' of said rolls 8 and 8' are provided with the usual intermeshing-gears, which are inclosed in the gear-box 10, and by means of which said rolls are caused respectively to rotate in opposite directions, also in the usual and well-known manner. The shaft 9 of the lower roll 8 is provided with an extension 11, which may be directly or indirectly connected and driven from some suitable source of power, such as an electric motor, water-motor, or the like.

The upper roll 8' is mounted so as to be capable of a certain amount of yielding vertical movement, as controlled by the pressure of the tensioning mechanism comprising the spring-members 12, cross-head 13, and adjusting-screws 14, all of which is common and well-known in the construction of clothes-wringers.

Secured to opposite sides of the clothes-wringers, so as to extend transversely from one standard-member to the other, are the side-members 15, the upper marginal edges of which register in a plane slightly below the axis of said lower roll 8.

Pivotally connected between said standard-members, so as to extend transversely between the same, is an oscillatable drip-board 16, which may be inclined downwardly from either side of the wringer and its rolls, and which serves to return the water wrung from the clothes passing through the rolls, to the receptacle from which the wet clothes are taken, or, in other words, to that side of the wringer from which the clothes are fed to the rolls.

Extending beneath said drip-board 16 is a cross-bar 17, and the under side of said drip-board is provided with spring-members 18 adapted to frictionally engage said cross-bar, and thereby retain said drip-board in either desired inclination or tilted position, as indicated in Fig. 3 of the drawings.

Secured upon the inner sides of said standard-members 2, so as to be vertically disposed upon one side of the rolls 8 and 8', are a pair of oppositely facing guide-members 19, the same providing vertical grooves or channels 20. Slidably mounted in said grooves or channels 20, so as to be capable of vertical movements, as guided by said grooves or channels 20 of said guide-members 19, is a transversely disposed guard-plate 21, the same possessing a longitudinal opening or slot 22, the outer edges of which are rounded or chamfered, as at 23. Connected with said guard-plate 21 are a pair of perforated ears or lugs 24, in which are journaled the upper ends 25 of suitable connecting-rods 26. The lower ends of said connecting-rods 26 are provided with inwardly turned journal-portions 27, which are receivable in suitable openings 28 formed in said drip-board 16, adjacent to one of its free ends, thereby pivotally connecting said connecting-rods with said drip-board, so that any movement of the latter will be transmitted to said guard-plate 21 and will produce a vertical movement thereof corresponding in direction to the movement of said drip-board. Also secured upon the inner sides of said standard-members 2, so as to be vertically disposed upon the opposite side of the rolls 8 and 8', are a pair of oppositely facing guide-members 29, the same providing vertical grooves or channels 30. Slidably mounted in said grooves or channels 30, so as to be capable of vertical movements, as guided by said grooves or channels 30 of said guide-members 29, is a transversely disposed guard-plate 31, the same possessing a longitudinal opening or slot 32, the outer edges of which are rounded or chamfered, as at 33. Connected with said guard-plate 31 are a pair of perforated ears or lugs 34, in which are journaled the upper ends 35 of suitable connecting-rods 36. The lower ends of said connecting rods 36 are provided with inwardly turned journal portions 37, which are receivable in suitable openings 38 formed in said drip-board 16, adjacent to the other or opposite of its free ends, thereby pivotally connecting said connecting-rods 36 with said drip-board, so that any movement of the latter will be transmitted to said guard-plate 31, and will produce a vertical movement thereof corresponding in direction to the movement of said drip-board.

As illustrated in Figs. 1 and 2, and 3 of the drawings, the clothes-wringer is shown ready for use, and arranged so that the clothes are to be fed to the rolls 8 and 8' from the left hand side of the machine. As so arranged it is necessary to so oscillate or move the drip-board 16, that it inclines downwardly at the left hand side of the machine, and upwardly at the right hand side thereof, so that, as thus positioned, it will catch, guide and return the water falling thereupon, as the same is squeezed from the clothes passing through the rolls 8 and 8', back into the tub or receptacle from which the wet clothes are taken.

If the drip-board 16 is not in such a position, it must be moved thereto, before beginning the wringing operations, by pressing the left hand end of the same downwardly. Such a downward movement of said drip-board 16 is transmitted through the connecting-rods 26 to said guard-plate 21, which is consequently caused to move downwardly in its guide-members 19 until its opening or slot 22 registers with the meeting surfaces of the rolls 8 and 8'. At the same time, since the drip-board 16 is pivoted its opposite or right hand end will move upward, and such upward movement will be transmitted through said connecting-rods 36 to said guard-plate 31, which will be thereupon carried upwardly in its guide-members 29, and consequently said guard-plate 31, and its opening or slot 32 will be removed from its guarding relation to said rolls 8 and 8', and consequently will not obstruct or impede the passage or movement of the clothes from the said rolls.

The machine being thus made ready for operation and use, the power is turned on and its rolls caused to rotate. The clothes are now taken up and inserted through said slot or opening 22 of the guard-plate 21 into contact with the said rolls 8 and 8' which grip the same and pull them through the said slot or opening 22, which is not large or wide enough to permit the fingers or hands to pass therethrough and come in contact with the said rolls, the guard-plate 21 thereby guarding the hands and fingers of the operator from injury by being caught in said rolls.

If it is desired to pass the clothes from the right to the left of the machine, the position of said drip-board 16 and the guard-plates interconnected therewith are reversed, as indicated by the dotted representation of said parts as shown in Fig. 3 of the drawings, and the rotation of the rolls 8 and 8' is reversed, so that such opposite movement of the clothes may be attained.

It will be thus apparent that no matter from which side the clothes are fed the rolls are properly guarded by my novel safety device, the guard-plates thereof being automatically positioned and controlled by the necessary operation of the drip-board 16, so that no mistakes can be made by the operator.

It is sometimes desirable to use the clothes-wringer for wringing extraordinarily heavy articles, such as blankets, bed-spreads, and the like, which possess such bulk as to not readily pass through the slots or openings of the guard-plates. In such event, the guard-plates may be removed easily and quickly by springing out of said connection with the drip-board 16, the lower journal-portions of the connecting-rods, thereupon disconnecting said guard-plates from said drip-board so that the same may be entirely removed from their respective guide-members. In such use of the clothes-wringer, the operator is little liable to injury since the rolls 8 and 8' have to be separated to accommodate the bulk of the heavy articles, and the process is slower, and the attention of the operator not apt to wander, as often occurs when successively feeding a large quantity of small articles through the clothes-wringer.

From the above description the many advantages and novelties of the present invention will be readily apparent without further specification.

I am aware that some changes may be made in the general arrangements and combinations of the various devices and parts, as well as in the details of the construction thereof, without departing from the scope of the present invention as set forth in the foregoing specification, and as defined in the claims appended thereto. Hence, I do not limit my invention to the exact arrangements and combinations of the devices and parts as described in the said specification, nor do I confine myself to the exact details of the construction of the said devices and parts as illustrated in the accompanying drawings.

I claim:—

1. The combination with a clothes-wringer having wringer rolls of an oscillatable drip-board, vertically movable guard-plates each provided with an opening, said guard-plates being arranged on opposite sides of said rolls, means for guiding said guard-plates, and means interconnecting said guard-plates respectively with the free ends of said drip-board.

2. The combination with a clothes-wringer comprising vertical standard-members, a pair of transversely mounted wringer-rolls, and a drip-board pivotally mounted beneath said rolls, of guide-members secured to said standard-members, a guard-plate slidably mounted in said guide-members, said guard-plate having a longitudinal opening adapted to be registered in line with the meeting surfaces of said rolls, and connecting-rods between said guard-plate and said drip-board, whereby an oscillatory movement of said drip-board produces a vertical movement of said guard-plate.

3. The combination with a clothes wringer comprising vertical standard-members, a pair of wringer rolls journaled therebetween, and an oscillatable drip-board pivoted to said standard-members beneath said rolls with its free ends extending from opposite sides of said rolls, vertically grooved guide-members secured upon said standard-members and located upon opposite sides of said rolls, guard-plates vertically movable in said guide-members and disposed transversely upon opposite sides of said rolls, and connecting-rods interconnecting said guard-plates respectively with the oppositely projecting ends of said drip-board, said guard-plates each having a longitudinal slot adapted to be brought in registration with or carried away from registration with the meeting surfaces of said rolls by the oscillatory movements of said drip-board.

4. In a clothes-wringer provided with wringer-rolls, a pair of vertically movable guard-plates having longitudinal openings therein disposed respectively upon opposite sides of said rolls, and means for simultaneously producing vertical movements of said guard-plates respectively in opposite directions to register one of said guard-plates with said rolls on one side of the latter and to remove from registration with said rolls said guard-plate on the opposite side of said rolls.

5. In a clothes wringer provided with wringer-rolls, a pair of vertically movable guard-plates having longitudinal openings therein disposed respectively upon opposite sides of said rolls, means mounted on said clothes-wringer frame for slidably supporting said guard-plates, a drip-board pivoted beneath said rolls so that its free ends extend from opposite sides of said rolls, connecting-rods respectively interconnecting the said guard-plates with the free ends of said drip-board whereby the oscillation of the ends of said drip-board simultaneously produces vertical movements of said guard-plates respectively in opposite directions to register one of said guard-plates with said rolls on one side of the latter and to remove from registration with said rolls said guard-plate on the opposite side of said rolls.

In testimony, that I claim the invention set forth above I have hereunto set my hand this 16th day of December, 1913.

HENRY LOEFFLER.

Witnesses:
GEORGE D. RICHARDS,
FRED'K H. W. FRAENTZEL.